No. 664,007. Patented Dec. 18, 1900.
C. B. SCHOENMEHL.
GALVANIC BATTERY.
(Application filed June 12, 1900.)

(No Model.) 2 Sheets—Sheet 1.

Witnesses
R. H. Newman
Anna Wanamaker.

Inventor
Charles B. Schoenmehl
By
Chamberlain & Newman
Attorneys

No. 664,007. Patented Dec. 18, 1900.
C. B. SCHOENMEHL.
GALVANIC BATTERY.
(Application filed June 12, 1900.)

(No Model.) 2 Sheets—Sheet 2.

Witnesses
R. H. Newman.
Anna Wanamaker.

Inventor
Charles B. Schoenmehl
By Chamberlain & Newman
Attorneys

THE NORRIS PETERS CO., PHOTO-LITHO., WASHINGTON, D. C.

# UNITED STATES PATENT OFFICE.

CHARLES B. SCHOENMEHL, OF WATERBURY, CONNECTICUT, ASSIGNOR TO THE WATERBURY BATTERY COMPANY, OF SAME PLACE.

GALVANIC BATTERY.

SPECIFICATION forming part of Letters Patent No. 664,007, dated December 18, 1900.

Application filed June 12, 1900. Serial No. 20,011. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Galvanic Batteries, of which the following is a specification.

This invention relates to new and useful improvements in galvanic batteries of that type employing oxid of copper, zinc, and a caustic-soda solution.

It is the object of my invention to improve upon batteries of the above class by producing what I term a "visible" type of battery, or one wherein the condition of the elements constituting the positive and negative poles may be detected; further, in arranging and supporting said poles in a manner which will permit of their ready detachment from a jar for cleansing or recharging, and, finally, to produce a battery the oxid of copper in the negative pole of which will be consumed uniformly, beginning from two opposite points.

With the above objects in view my invention resides and consists in the novel construction and combination of parts illustrated upon the accompanying drawings, forming a part of this specification, and upon which similar characters of reference denote like or corresponding parts throughout the several figures, and of which—

Figure 1:
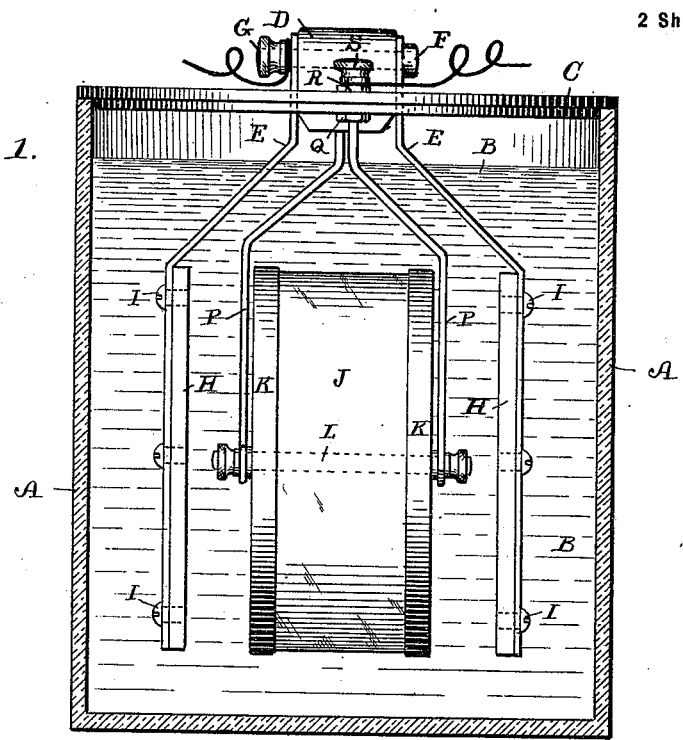
Figure 2:
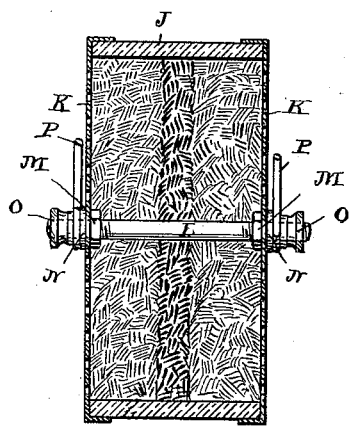
Figure 3:
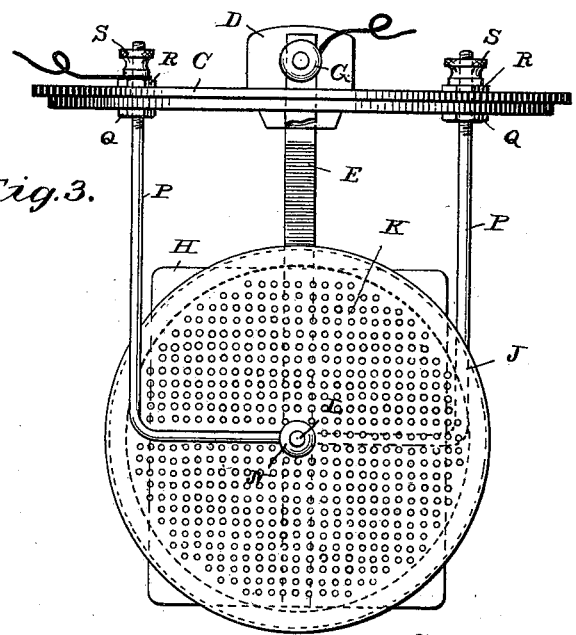
Figure 4:
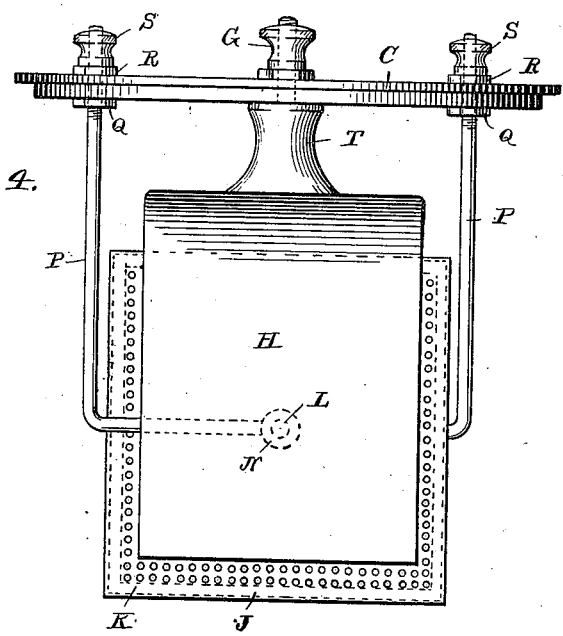
Figure 5:
Figure 6:
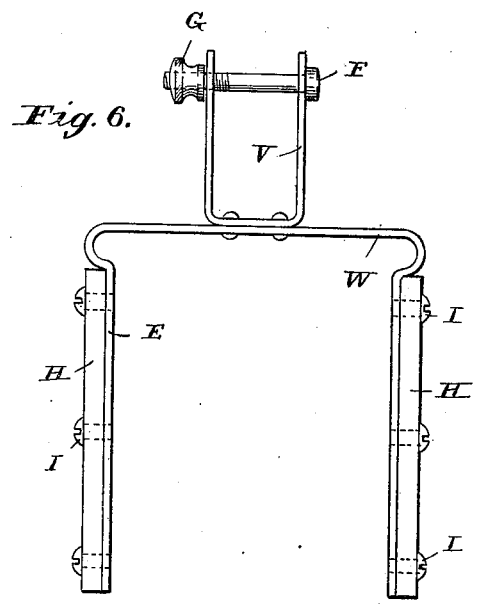

Figure 1 is a section of a jar with my improved element shown therein in side elevation. Fig. 2 is a detached central vertical cross-section of the negative element shown in Fig. 1. Fig. 3 is a detached side view of the cover and elements shown in Fig. 1, one of the zinc plates being broken away for the sake of clearness. Fig. 4 is a side elevation of a slight modification, the same comprising a square negative element and a simplified form of zinc. Fig. 5 is a side elevation of the zinc shown in Fig. 4. Fig. 6 is a further variation in the matter of construction of zinc.

I have found in practice that a negative element comprising, broadly, a cylindrical transparent body with two metallic and contact plates with an internal filling of copper oxid will work more uniformly in some instances when arranged horizontally than it will if in a vertical position. My invention therefore embodies in part a negative element comprising an oxid-of-copper chamber arranged to operate from side to side, as will now be described in detail.

Referring to the characters of reference marked upon the drawings, A indicates the jar; B, caustic-soda or other suitable solution; C, a cover, and D a lug upon the top of the cover.

E E indicate depending metallic strips, which are secured to the lug D by means of a bolt F and a binding-nut G, the latter serving also as a connection for the field-wire. To these strips I detachably secure the zinc plates H by means of screws I, as will be clearly apparent from Fig. 1 of the drawings. This construction permits of the substitution of new plates for the old and decomposed ones when recharging is necessary and does not require the replacement of new hangers E E. The negative element, as will be seen, comprises a glass of cylindrical body J, the two ends of which are provided with a perforated sheet-metal cover K, the two being held against the cylinder by means of the bolt L, having stop-nuts M M, washers N, and jam-nuts O. The interior of this body in practice is filled with oxid of copper, and, as will be apparent, the same is first attached by the coacting elements from the two sides adjacent to the metallic covers and is gradually consumed in toward the center, which produces a transformation in color, apparent through the glass cylinder, and which thus reveals the condition of the copper oxid and the quantity thereof still available for use. The negative element is suspended from the cover by means of rods P P, which are connected to the opposite ends of the bolt L, before mentioned. These rods are preferably carried outward and bent up at a right angle and parallel with the side of the end plates, as clearly shown. Said wires are attached to the cover by a stop-nut Q upon the under side, a jam-nut R on the top side, and a binding-nut S. The suspending-rods P referred to are L-shaped, as shown, to better accommodate the zinc elements, which are arranged at opposite sides of the negative element, thus permitting of the more ready attachment and detachment of the two. The field-wires for the battery are attached to the binding-nut G of the zinc upon one side and either of the binding-nuts S of the negative element upon the other side, thus permitting the battery to be connected in series in the usual manner, if desired.

In Fig. 4 I have shown a plain flat cover with a modified form of zinc attached thereto. This zinc comprises a single strip of U-shaped zinc with a central post T, by means of which it is attached to the cover, as shown. The negative element in this form is similar to that shown in the other forms, except that the receptacle is square instead of round.

In Fig. 6 I have shown a slight change in the construction for the supports of the zinc, the same comprising a large and small U-shaped strip V and W, the backs of the two being riveted together, forming an upper member for attachment to the cover, as in Figs. 1 and 2, and a lower member to retain the zincs.

Having thus described my invention, what I claim, and desire to secure by Letters Patent, is—

1. In a battery of the class described, the combination with a negative element comprising a glass tubular body, oxid of copper in said body, perforated metallic ends to the tube, a bolt connecting said ends, rods attached to opposite ends of the bolt by means of which the element is supported, of a zinc located opposite to said metallic ends, and means for detachably suspending the same from the cover, substantially as described.

2. In a galvanic battery the combination with a positive element, comprising zinc located on opposite side of the negative element, metal strips detachably secured to the cover of the battery and means for detachably connecting said zinc to said strips, of a negative element comprising a glass tubular body, an oxid element therein, perforated metallic covers inclosing the ends of the tube, a bolt central of said cover and body, stop-nuts arranged on said bolt and upon the inside of the covers, washers, and jam-nuts upon the outside of said covers by means of which the latter are secured in place, supporting-rods engaged by said jam-nuts, and means for suspending said rods, substantially as shown and described.

3. In a battery of the class described, the combination of a negative element comprising a glass tubular body, an oxid-of-copper element in said body, perforated metallic ends to the tube, a bolt connecting said ends and rods attached to the opposite ends of the bolt by means of which the element is supported.

4. In a galvanic battery, the combination of a negative element comprising a glass tubular body, an oxid-of-copper element therein, perforated metallic covers inclosing the ends of the tube, a bolt central of said cover and body, stop-nuts arranged on said bolt and upon the inside of the covers, washers, and jam-nuts upon the outside of said covers by means of which the latter are secured in place, supporting-rods engaged by said jam-nuts, and means for retaining the same, substantially as shown and described.

5. The combination in a galvanic battery, with a jar and cover, of a negative element in said jar comprising a glass tubular body, an oxid-of-copper element therein, perforated plates covering the ends thereof, a central bolt in said tube and covers, nuts arranged upon said bolt to retain the covers in place, separate rods interposed between the opposite ends of the bolt and the cover, depending hangers secured to the cover and provided with detachable zinc plates, substantially as shown and described.

Signed at Waterbury, New Haven county, Connecticut, this 24th day of May, A. D. 1900.

CHARLES B. SCHOENMEHL.

Witnesses:
C. M. NEWMAN,
HARRIET L. SLASON.